(12) United States Patent
Kim et al.

(10) Patent No.: US 8,432,605 B2
(45) Date of Patent: Apr. 30, 2013

(54) ELECTROPHORETIC INDICATION DISPLAY DEVICE

(75) Inventors: Min-Woo Kim, Yongin (KR); Soo-Min Baek, Yongin (KR); Jae-Kyoung Kim, Yongin (KR); Il-Nam Kim, Yongin (KR); Dong-Hun Lim, Yongin (KR)

(73) Assignee: Samsung Display Co., Ltd., Gihueng-Gu, Yongin, Gyeonggi-Do (KR)

( * ) Notice: Subject to any disclaimer, the term of this patent is extended or adjusted under 35 U.S.C. 154(b) by 13 days.

(21) Appl. No.: 13/051,143

(22) Filed: Mar. 18, 2011

(65) Prior Publication Data

US 2012/0092752 A1    Apr. 19, 2012

(30) Foreign Application Priority Data

Oct. 18, 2010 (KR) .................... 10-2010-0101415

(51) Int. Cl.
*G02B 26/00* (2006.01)
*G09G 3/34* (2006.01)

(52) U.S. Cl.
USPC .......................... 359/296; 345/107

(58) Field of Classification Search ............... 359/296; 345/107

See application file for complete search history.

(56) References Cited

U.S. PATENT DOCUMENTS 7,999,997 B2 *   8/2011   Komatsu et al. ............. 359/296

FOREIGN PATENT DOCUMENTS

| JP | 3211276 | 7/2001 |
| JP | 2007-171276 | 7/2007 |
| KR | 10-2007-0074967 | 7/2007 |

* cited by examiner

*Primary Examiner* — Jack Dinh
(74) *Attorney, Agent, or Firm* — Robert E. Bushnell, Esq.

(57) ABSTRACT

An electrophoretic display device comprises: a first substrate including a first electrode; a first insulation layer provided on the first electrode; a fluid layer provided on the first insulation layer and having fluid and charged particles; a second substrate facing the first substrate with the fluid layer therebetween and including a second electrode facing the first electrode; and a second insulation layer provided between the second electrode and the fluid layer and facing the first insulation layer.

22 Claims, 5 Drawing Sheets

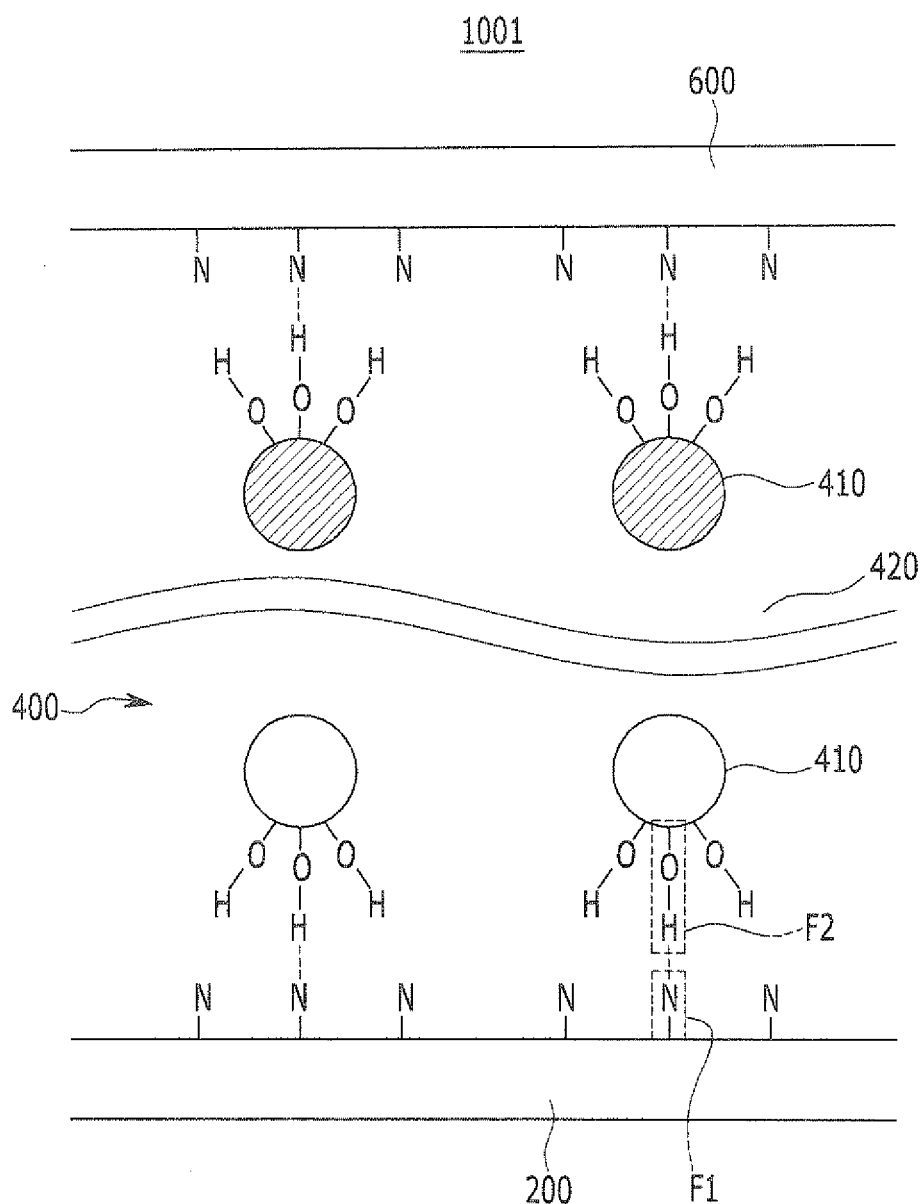

ELECTROPHORETIC INDICATION DISPLAY DEVICE

CLAIM OF PRIORITY

This application makes reference to, incorporates the same herein, and claims all benefits accruing under 35 U.S.C. §119 from an application earlier filed in the Korean Intellectual Property Office on the 18$^{th}$ of Oct. 2010 and there duly assigned Serial No. 10-2010-0101415.

BACKGROUND OF THE INVENTION

1. Field of the Invention

The present invention relates generally to an electrophoretic display device. More particularly, the present invention relates to an electrophoretic display device which includes an insulation layer.

2. Description of the Related Art

An electrophoretic display device has high reflectivity and a high contrast ratio, and does not depend on the viewing angle, differing from the liquid crystal display (LCD), so that it can display flat images like paper.

The electrophoretic display device includes two substrates on which electrodes are formed and charged particles formed between the substrates, and it displays images by applying a voltage to the facing electrodes and moving the charged particles to the electrodes with opposite polarities.

The electrophoretic display device is required to maintain the images without successive application of voltage so that it has to provide a bistability characteristic to the charged particles.

The above information disclosed in this Background section is only for enhancement of an understanding of the background of the described technology, and therefore it may contain information which does not form the prior art which is already known in this country to a person of ordinary skill in the art.

SUMMARY OF THE INVENTION

The present invention has been developed in an effort to provide an electrophoretic display device for easily providing a bistability characteristic to charged particles.

An exemplary embodiment of the invention provides an electrophoretic display device comprising: a first substrate including a first electrode; a first insulation layer provided on the first electrode; a fluid layer provided on the first insulation layer and having fluid and charged particles; a second substrate facing the first substrate with the fluid layer therebetween, and including a second electrode facing the first electrode; and a second insulation layer provided between the second electrode and the fluid layer, and facing the first insulation layer.

The fluid layer contacts the first insulation layer and the second insulation layer between the first insulation layer and the second insulation layer.

At least one of the first insulation layer and the second insulation layer includes a first functional group exposed on a surface, and the charged particles include a second functional group exposed on the surface and available for a hydrogen bond with the first functional group.

The first functional group and the second functional group are the same or different from each other, and are independently an acryl group, $—OR^1$, $—F$, $—NR^2R^3$, or a combination thereof, and the $R^1$ to $R^3$ are the same or different from each other, and are independently hydrogen, a substituted or unsubstituted C1 to C10 alkyl group, a substituted or unsubstituted C2 to C30 heteroaryl group, a substituted or unsubstituted C6 to C30 aryl group, or a combination thereof.

At least one of the first insulation layer and the second insulation layer includes an organic material or an inorganic material.

At least one of the first insulation layer and the second insulation layer includes at least one of silicon oxide ($SiO_2$) and silicon nitride ($SiN_x$).

At least one of the first insulation layer and the second insulation layer includes at least one of a photosensitive material and a polyimide including an acryl group.

At least one of the first insulation layer and the second insulation layer is surface-treated by at least one of oxygen plasma, nitrogen plasma, and fluorine plasma.

According to embodiments of the invention, there is provided an electrophoretic display device having a bistability characteristic which is provided to the charged particles.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 3 shows hydrogen bonds between charged particles and an insulation layer in an electrophoretic display device according to the first exemplary embodiment of the invention.

DETAILED DESCRIPTION OF THE INVENTION

Figure 1:
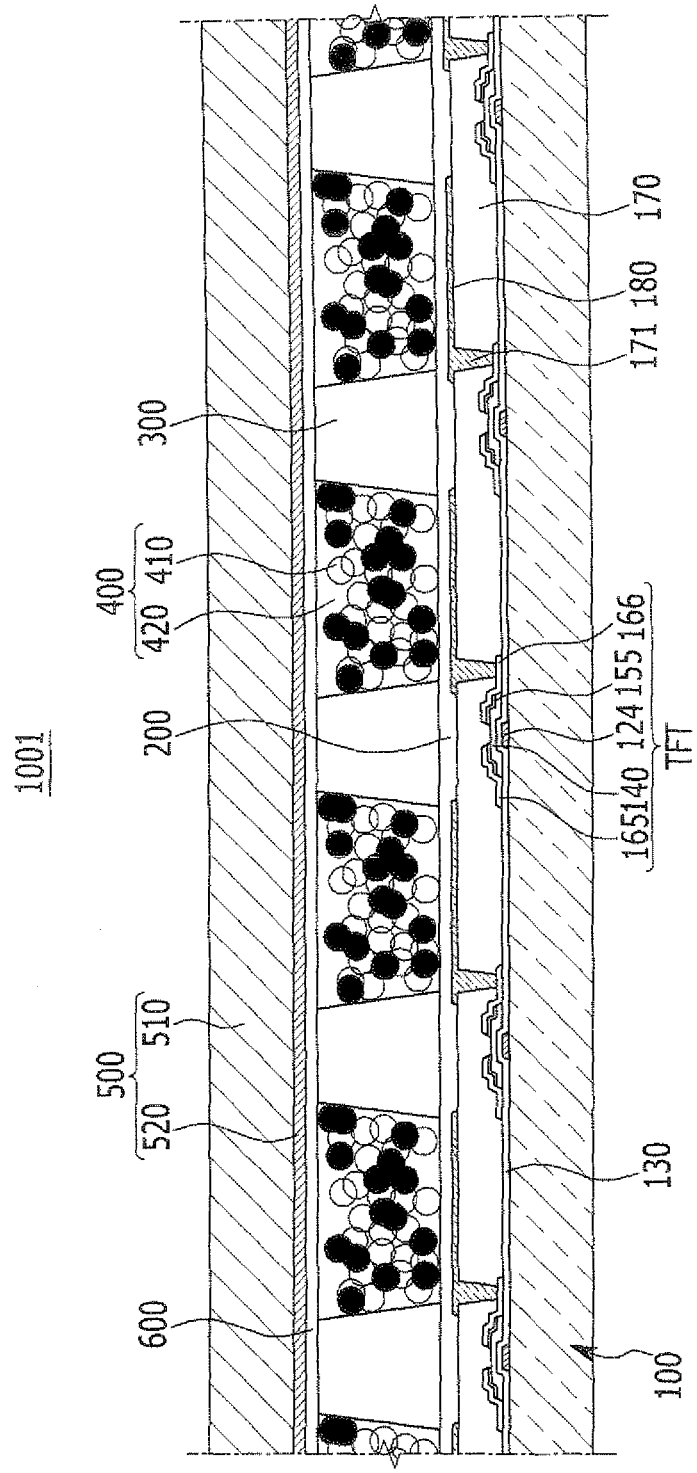
FIG. 1 is a cross-sectional view of an electrophoretic display device according to a first exemplary embodiment of the invention.

The present invention will be described more fully hereinafter with reference to the accompanying drawings, in which exemplary embodiments of the invention are shown. As those skilled in the art will realize, the described embodiments may be modified in various different ways, all without departing from the spirit or scope of the present invention. Like reference numerals designate like elements throughout the specification. The size and thickness of each component shown in the drawings are arbitrarily shown for understanding and ease of description, but the present invention is not limited thereto.

In the drawings, the thickness of layers, films, panels, regions, etc., are exaggerated for clarity. In addition, in the drawings, for understanding and ease of description, the thicknesses of some layers and areas are exaggerated. It will be understood that, when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. It will be understood that, when an element such as a layer, film, region, or substrate is referred to as being "on" another element, it can be directly on the other element or intervening elements may also be present.

Referring to FIG. 1 thru FIG. 3, an electrophoretic display device according to the first exemplary embodiment will now be described.

FIG. 1 is a cross-sectional view of an electrophoretic display device according to a first exemplary embodiment of the invention.

As shown in FIG. 1, the electrophoretic display device 1001 includes a first substrate 100, a first insulation layer 200, a barrier rib 300, a fluid layer 400, a second substrate 500, and a second insulation layer 600.

Regarding the first substrate 100, a gate wire including a plurality of gate electrodes 124 is formed on the first substrate 100. Although not shown, the gate wire may further include a plurality of gate lines connected to the gate electrodes 124, and a plurality of first sustain electrode lines. In this instance, the first substrate 100 is formed with an insulating substrate made of glass, quartz, ceramic, or plastic. Particularly, when the first substrate 100 is formed with a flexible material, the application range of the electrophoretic display device 1001 is increased, thereby further improving the usability of the electrophoretic display device 1001.

The gate wire, including the gate electrodes 124, comprises a metal such as Al, Ag, Cr, Ti, Ta, or Mo, or an alloy thereof. In FIG. 1, the gate wire is illustrated as a single layer, but the gate wire can be formed with multiple layers including a metal layer of Cr, Mo, Ti, or Ta with excellent physical and chemical characteristics, or an alloy thereof, or a metal layer or an Al or Ag family with less resistivity. In addition, the gate wire can be made with various metals or conductors, and the multilayers can be patterned under the same etching condition.

A gate insulating layer 130 made of silicon nitride ($SiN_x$) is formed on the gate wire.

A data wire is formed on the gate insulating layer 130, and it includes a plurality of source electrodes 165 having at least one region overlapping the gate electrode 124, and a plurality of drain electrodes 166 disposed separately from the source electrodes 165 and having at least one region overlapping the gate electrode 124. Although not shown, the data wire may further include a plurality of data lines crossing the gate line and a plurality of second sustain electrode lines crossing the first sustain electrode lines.

In a manner similar to the gate wire, the data wire is made of a conducting material such as chromium, molybdenum, aluminum, or an alloy thereof, and it can be formed to be a single layer or multiple layers.

A semiconductor layer 140 is provided between the gate insulating layer 130, the source electrode 165, and the drain electrode 166 corresponding to the gate electrode 124, and a resistant contact layer 155 for reducing contact resistance is formed between the semiconductor layer 140, the source electrode 165, and the drain electrode 166. The resistant contact layer 155 includes silicide or amorphous silicon in which n-type impurity is doped in a high concentration.

The above-described gate electrode 124, semiconductor layer 140, resistant contact layer 155, source electrode 165, and drain electrode 166 form a thin film transistor (TFT).

A protection layer 170, including a low dielectric constant insulating material such as a-Si:C:O or a-Si:O:F formed by plasma enhanced chemical vapor deposition (PECVD) or an inorganic insulating material such as a silicon nitride or a silicon oxide, is formed on the data wire.

The protection layer 170 includes a contact hole 171 for revealing a part of the drain electrode 166, and a first electrode 180 (to be described below) is connected to the drain electrode 166 through the contact hole 171. The first electrode 180 is formed on the protection layer 170.

The first electrode 180 is patterned in a form corresponding to the pixel displayed by the electrophoretic display device 1001. The first electrode 180 includes a transparent conducting material, such as indium tin oxide (ITO) or indium zinc oxide (IZO) or an opaque conducting material such as aluminum (Al). A first insulation layer 200 is provided on the first electrode 180.

The first insulation layer 200 is provided on the first electrode 180 and contacts the fluid layer 400. The first insulation layer 200 includes an organic material or inorganic material, and includes silicon nitride ($SiN_x$) among them. The first insulation layer 200 includes a first functional group F1 (shown in FIG. 3) exposed on the surface, and the first functional group F1 can be hydrogen-combined with a second functional group F2 (shown in FIG. 3) of charged particles 410 to be described. Since the first insulation layer 200 includes silicon nitride, the first functional group F1 exposed on the surface of the first insulation layer 200 is the —NH group.

In another exemplary embodiment, the first insulation layer 200 may include silicon oxide ($SiO_x$).

A barrier rib 300 for partitioning the fluid layer 400 is provided in the first insulation layer 200.

The barrier rib 300 partitions the fluid layer 400. Also, since the barrier rib 300 maintains a cell gap between the first substrate 100 and the second substrate 500, no additional spacer is needed between the first substrate 100 and the second substrate 500.

The fluid layer 400 is provided between the first insulation layer 200 and the second insulation layer 600 to be described. The fluid layer 400 contacts the first insulation layer 200 and the second insulation layer 600 between the first insulation layer 200 and the second insulation layer 600, and includes a fluid 420 and charged particles 410 dispersed in the fluid 420.

It is desirable for the fluid 420 to have low viscosity for high mobility of the charged particles 410, and to also have a low dielectric constant so as to suppress chemical reaction. It is also desirable for the fluid 420 to be transparent so as to acquire reflective luminance. Examples of the fluid 420 include: a hydrocarbon such as decahydronaphthalene, 5-ethylidene-2-norbor(dene), a fatty oil and paraffin oil; an aromatic hydrocarbon such as toluene, xylene, phenylxylylethane, dodecylbenzene and alkyl naphthalene; and halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane and pentachlorobenzene.

The charged particles 410 may include black sub-particles and white sub-particles, or may include at least one of red sub-particles, green sub-particles, blue sub-particles, cyan sub-particles, magenta sub-particles and yellow sub-particles. The respective sub-particles are charged with different polarities so that they can move in opposite directions. The sub-particles can be made by coloring a pigment to a titanium oxide ($TiO_2$) or silicon oxide ($SiO_2$). That is, the charged particles include titanium oxide or silicon oxide. The charged particles 410 move up and down according to an electric field formed between the first electrode 180 and a second electrode 520, and they control the amount of light reflected by the electrophoretic display device 1001. The charged particles 410 may express a proper charge, may be clearly charged by using a charge control agent, and may acquire a charge while floating in a solvent. The charge control agent may be polymer or non-polymer, or an ion or a non-ion, and may be sodium dodecyl benzene sulfonate, metal soap, polybutene succinimide, a maleic anhydride copolymer, a vinyl pyridine copolymer, a vinyl pyrrolidone copolymer, or an acryl(methacrylic) acid copolymer. The particles dispersed in the fluid 420, such as the charged particles 410 or the charge control agent, must satisfy mutual colloidal stability, which is achievable by controlling the size of the particles and surface charges.

Also, the charged particles 410 include a second functional group F2 (shown in FIG. 3) exposed on the surface, and the second functional group F2 can be hydrogen-combined with a first functional group F1 (shown in FIG. 3) of the first insulation layer 200 and a first functional group F1 of the second insulation layer 600. The charged particles 410 include titanium oxide or silicon oxide so that the second functional group F2 exposed on the surface of the charged particles 410 is an —OH group.

The second substrate 500 is provided so as to contact the fluid layer 400.

The second substrate 500 faces the first substrate 100 with the fluid layer 400 therebetween, and includes a second substrate main body 510 and a second electrode 520.

The second electrode 520 is generally made of a transparent conducting material such as indium tin oxide (ITO) or indium zinc oxide (IZO). The second electrode 520 is formed over the whole second substrate main body 510, and forms an electric field for driving the positive or negative charged particles 410 together with the first electrode 180.

In the latter regard, at least one of the first substrate main body 110 and the second substrate main body 510 is transparent, and when at least one of the first substrate main body 110 and the second substrate main body 510 is made of plastic, it is possible to manufacture the electrophoretic display device 1001 to be light, slim and flexible.

The second insulation layer 600 is provided between the second substrate 500 and the fluid layer 400.

The second insulation layer 600 is provided on the second electrode 520 and contacts the fluid layer 400. The second insulation layer 600 includes an organic material or an inorganic material, and includes silicon nitride ($SiN_x$) among them. The second insulation layer 600 includes the first functional group F1 (shown in FIG. 3) exposed on the surface, and the first functional group F1 can be hydrogen bonded with the second functional group F2 (shown in FIG. 3) of the charged particles 410. The second insulation layer 600 includes silicon nitride so that the first functional group F1 exposed on the surface of the second insulation layer 600 is an —NH group.

As described, in the electrophoretic display device 1001 according to the first exemplary embodiment, the first insulation layer 200 and the second insulation layer 600 include the —NH group as the first functional group F1, and the charged particles 410 include the —OH group as the second functional group F2. In the electrophoretic display device according to another exemplary embodiment, the first functional group of the first insulation layer and the second insulation layer and the second functional group of the charged particles can be the same or different, and can independently be the acryl group, —$OR^1$, —F, —$NR^2R^3$, or a combination thereof. Here, $R^1$ to $R^3$ are the same or different, and can independently be hydrogen, a substituted or unsubstituted C1 to C10 alkyl group, a substituted or unsubstituted C2 to C30 heteroaryl group, a substituted or unsubstituted C6 to C30 aryl group, or a combination thereof.

Figure 2A:
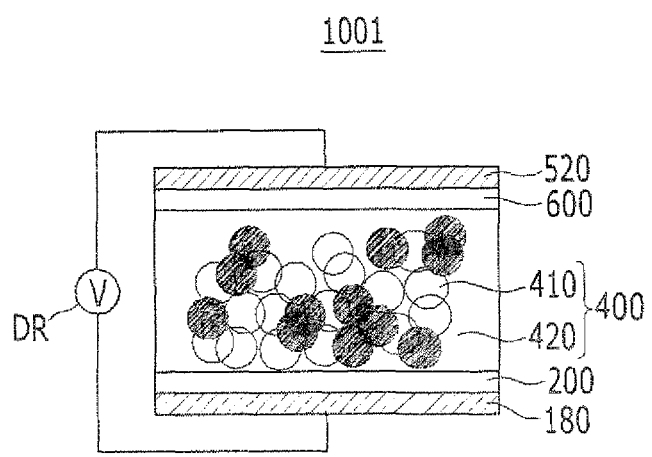
FIGS. 2A and 2B show a method for driving an electrophoretic display device according to the first exemplary embodiment of the invention.
Figure 2B:
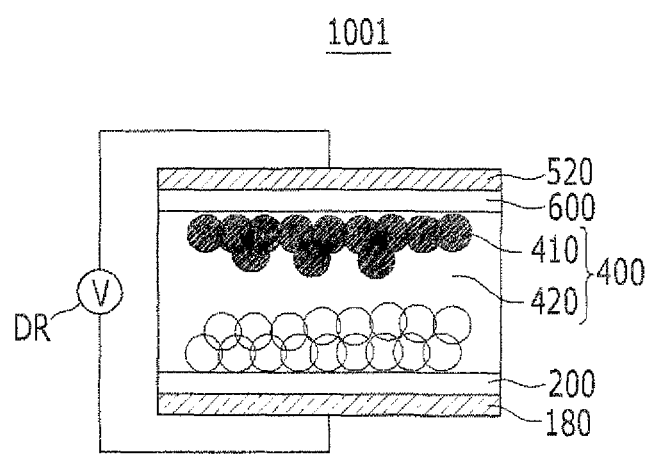

Referring to FIG. 2A and FIG. 2B, an electrophoretic display device 1001 according to the first exemplary embodiment will now be described.

FIG. 2A and FIG. 2B show a method for driving an electrophoretic display device according to the first exemplary embodiment of the invention.

As shown in FIG. 2A and FIG. 2B, the electrophoretic display device 1001 includes a pair of electrodes for forming the electric field, and one of the pair of electrodes is the first electrode 180 and the other thereof is the second electrode 520 to which a common voltage is supplied. When a voltage with a potential difference (+, −) is supplied to the first electrode 180 and the second electrode 520 from the driver DR, the positive or negative charged particles 410 move up or down to the first electrode 180 or the second electrode 520 to which the voltage of the opposite polarity is applied. In this instance, the user senses the light applied from the outside and reflected on the charged particles 410. When the charged particles 410 move up so as to be near the user, the user strongly senses the color of the charged particles 410, and when the charged particles 410 move downward, the user weakly senses the color of the charged particles 410. The movement of the charged particles 410 is caused by electrophoresis, and the electrophoretic display device 1001 accordingly displays the image.

In the latter regard, the electrophoresis represents a phenomenon in which the particles with surface charges move to the electrode with opposite charges in the electric field.

Particularly, as shown in of FIG. 2B, when the charged particles 410 move to the first electrode 180 or the second electrode 520 with the opposite polarity, a hydrogen bond between the first functional group F1 (shown in FIG. 3) and the second functional group F2 (shown in FIG. 3) is formed between the first electrode 180 and the charged particles 410, and between the second electrode 520 and the charged particles 410, which will be described with reference to FIG. 3.

FIG. 3 shows a hydrogen bond between charged particles and an insulation layer in an electrophoretic display device according to the first exemplary embodiment of the invention.

As shown in FIG. 3, the —NH group, which is the first functional group F1, is exposed on each surface of the first insulation layer 200 and the second insulation layer 600, and the —OH group, which is the second functional group F2, is exposed on the surface of the charged particles 410. In this instance, when a voltage is applied to the first electrode 180 and the second electrode 520 and the charged particles 410 are moved so as to be nearer the first insulation layer 200 and the second insulation layer 600, the —OH group (which is the second functional group F2 of the charged particles 410) and the —N group (among the first functional groups F1 of the first insulation layer 200 and the second insulation layer 600) are hydrogen-combined so that the charged particles 410 are maintained near the first insulation layer 200 and the second insulation layer 600. That is, when the voltage is supplied to the first electrode 180 and the second electrode 520, the charged particles 410 are near the first insulation layer 200 and the second insulation layer 600 because of the hydrogen bond while no voltage is supplied to the first electrode 180 and the second electrode 520, and a bistability characteristic is assigned to the charged particles 410 since the charged particles 410 become near the first insulation layer 200 and the second insulation layer 600 while the voltage is supplied to the first electrode 180 and the second electrode 520.

The hydrogen bond between the first functional group F1 and the second functional group F2 can be increased by Coulomb's law as the distance of the atoms becomes closer, and can also be increased by the difference of electronegativity of the respective atoms. Furthermore, the bonding force of the hydrogen bond between the first functional group F1 and the second functional group F2 can be controlled by controlling the density of the first functional group F1, exposed on the surfaces of the first insulation layer 200 and the second insulation layer 600, and the second functional group F2, exposed on the surface of the charged particles 410.

Accordingly, the electrophoretic display device 1001 can maintain the image without continuously supplying the voltage to the first electrode 180 and the second electrode 520 by assigning the bistability characteristic to the charged particles 410 by use of the hydrogen bond of the first functional group F1 of the first insulation layer 200 and the second insulation layer 600 and the second functional group F2 of the charged particles 410, thereby improving the display quality of the image displayed by the electrophoretic display device 1001.

An electrophoretic display device according to a second exemplary embodiment and a third exemplary embodiment will now be described with reference to FIG. 4 and FIG. 5.

Distinctive features differing from the first exemplary embodiment will be described, and description common to that of the first exemplary embodiment will be omitted. The second exemplary embodiment and the third exemplary embodiment have the same reference numerals for the same constituent elements as the first exemplary embodiment for better comprehension and ease of description.

Figure 4:
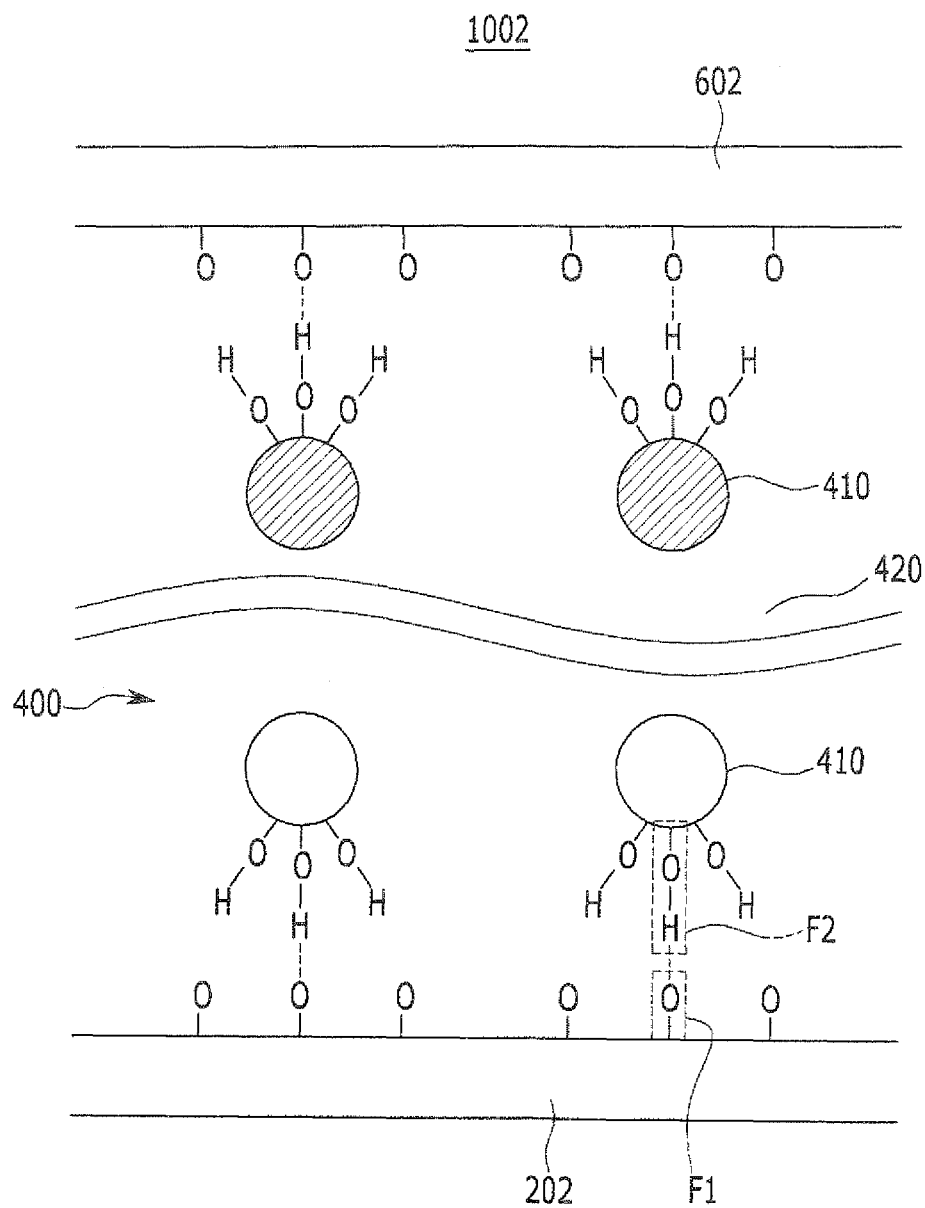
FIG. 4 shows hydrogen bonds between charged particles and an insulation layer in an electrophoretic display device according to a second exemplary embodiment of the invention.

FIG. 4 shows hydrogen bonds between charged particles and an insulation layer in an electrophoretic display device according to a second exemplary embodiment of the invention.

As shown in FIG. 4, the electrophoretic display device 1002 includes a first insulation layer 202 and a second insulation layer 602 including at least one of a photosensitive material and a polyimide comprising an acryl group.

The first functional group F1 is exposed on each surface of the first insulation layer 202 and the second insulation layer 602, and the —OH group, which is the second functional group F2, is exposed on the surface of the charged particles 410. In this instance, when a voltage is applied to the first electrode 180 and the second electrode 520 and the charged particles 410 move so as to be near the first insulation layer 202 and the second insulation layer 602, the —OH group (which is the second functional group F2 of the charged particles 410) and the —O group (among the first functional groups F1 of the first insulation layer 202 and the second insulation layer 602) are mutually hydrogen-combined so that the charged particles 410 are maintained near the first insulation layer 202 and the second insulation layer 602. That is, when the voltage is applied to the first electrode 180 and the second electrode 520, the charged particles 410 become near the first insulation layer 202 and the second insulation layer 602 by the hydrogen bond while no voltage is applied to the first electrode 180 and the second electrode 520, and the bistability characteristic is assigned to the charged particles 410 since the charged particles 410 become near the first insulation layer 202 and the second insulation layer 602 while the voltage is applied to the first electrode 180 and the second electrode 520.

Accordingly, the electrophoretic display device 1002 can maintain the image without continuously supplying the voltage to the first electrode 180 and the second electrode 520 by assigning a bistability characteristic to the charged particles 410 by use of the hydrogen bond of the first functional group F1 of the first insulation layer 202 and the second insulation layer 602 and the second functional group F2 of the charged particles 410, thereby improving the display quality of the image displayed by the electrophoretic display device 1002.

Figure 5:
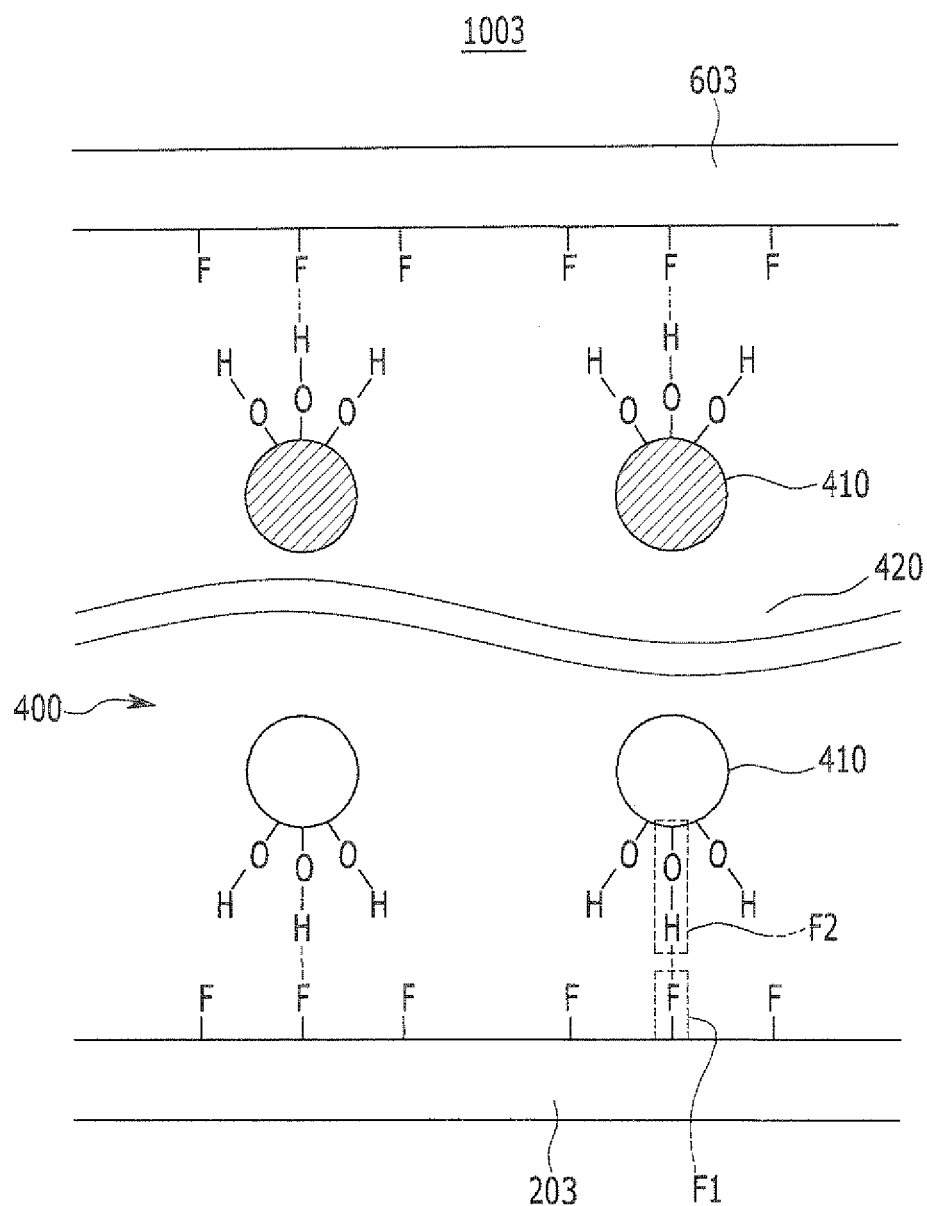
FIG. 5 shows hydrogen bonds between charged particles and an insulation layer in an electrophoretic display device according to a third exemplary embodiment of the invention.

FIG. 5 shows hydrogen bonds between charged particles and an insulation layer in an electrophoretic display device according to a third exemplary embodiment of the invention.

As shown in FIG. 5, the electrophoretic display device 1003 includes a first insulation layer 203 and a second insulation layer 603 having a surface treated by fluorine (F) plasma.

The first functional group F1 is exposed on each surface of the first insulation layer 203 and the second insulation layer 603, and the —OH group, which is the second functional group F2, is exposed on the surface of the charged particles 410. In this instance, when a voltage is applied to the first electrode 180 and the second electrode 520 and the charged particles 410 move so as to be near the first insulation layer 203 and the second insulation layer 603, the —OH group (the second functional group F2 of the charged particles 410) and the —F group (among the first functional groups F1 of the first insulation layer 203 and the second insulation layer 603) are mutually hydrogen-combined so that the charged particles 410 are maintained near the first insulation layer 203 and the second insulation layer 603. That is, while no voltage is supplied to the first electrode 180 and the second electrode 520 after the voltage is supplied to the first electrode 180 and the second electrode 520, the charged particles 410 become near the first insulation layer 203 and the second insulation layer 603 by the hydrogen bond, and while a voltage is applied to the first electrode 180 and the second electrode 520, the charged particles 410 become near the first insulation layer 203 and the second insulation layer 603, thereby assigning the bistability characteristic to the charged particles 410.

The bonding force of the hydrogen bond between the first functional group F1 and the second functional group F2 is controllable by controlling the density of the first functional group F1 exposed on each surface of the first insulation layer 203 and the second insulation layer 603 according to the surface treatment degree using plasma for the first insulation layer 203 and the second insulation layer 603.

Also, at least one of the first insulation layer 203 and the second insulation layer 603 of the electrophoretic display device according to another exemplary embodiment can be surface-treated by at least one of oxygen plasma and nitrogen plasma.

Accordingly, the electrophoretic display device 1003 according to the third exemplary embodiment can maintain the image without continuously applying the voltage to the first electrode 180 and the second electrode 520 by assigning a bistability characteristic to the charged particles 410 by using the hydrogen bond by use of the first functional group F1 of the first insulation layer 203 and the second insulation layer 603 and the second functional group F2 of the charged particles 410, so that the display quality of the image displayed by the electrophoretic display device 1003 is improved.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. An electrophoretic display device, comprising:
a first substrate including a first electrode;
a first insulation layer provided on the first electrode;
a fluid layer provided on the first insulation layer and having fluid and charged particles;

a second substrate facing the first substrate with the fluid layer therebetween, and including a second electrode facing the first electrode; and a second insulation layer provided between the second electrode and the fluid layer, facing the first insulation layer, and separate from and not connected to the first insulation layer.

2. The electrophoretic display device of claim 1, wherein the fluid layer contacts the first insulation layer and the second insulation layer between the first insulation layer and the second insulation layer.

3. The electrophoretic display device of claim 2, wherein at least one of the first insulation layer and the second insulation layer includes a first functional group exposed on a surface, and the charged particles include a second functional group exposed on the surface and available for a hydrogen bond with the first functional group.

4. The electrophoretic display device of claim 3, wherein the first functional group and the second functional group are one of the same as each other and different from each other, and are independently one of an acryl group, $-OR^1$, $-F$, $-NR^2R^3$ and a combination thereof, and the $R^1$ to $R^3$ are one of the same as each other and different from each other, and are independently one of hydrogen, a C1 to C10 alkyl group, a C2 to C30 heteroaryl group, a C6 to C30 aryl group and a combination thereof.

5. The electrophoretic display device of claim 4, wherein the C1 to C10 alkyl group comprises one of a substituted C1 to C10 alkyl group and an unsubstituted C1 to C10 alkyl group.

6. The electrophoretic display device of claim 4, wherein the C2 to C30 heteroaryl group comprises one of a substituted C2 to C30 heteroaryl group and an unsubstituted C2 to C30 heteroaryl group.

7. The electrophoretic display device of claim 4, wherein the C6 to C30 aryl group comprises one of a substituted C6 to C30 aryl group and an unsubstituted C6 to C30 aryl group.

8. The electrophoretic display device of claim 1, wherein at least one of the first insulation layer and the second insulation layer includes one of an organic material and an inorganic material.

9. The electrophoretic display device of claim 1, wherein at least one of the first insulation layer and the second insulation layer includes at least one of silicon oxide ($SiO_2$) and silicon nitride ($SiN_x$).

10. The electrophoretic display device of claim 1, wherein at least one of the first insulation layer and the second insulation layer includes at least one of a photosensitive material and a polyimide including an acryl group.

11. The electrophoretic display device of claim 1, wherein at least one of the first insulation layer and the second insulation layer is surface-treated by at least one of oxygen plasma, nitrogen plasma, and fluorine plasma.

12. The electrophoretic display device of claim 1, further comprising a thin film transistor disposed in a space between the first substrate and the first electrode.

13. The electrophoretic display device of claim 12, wherein the thin film transistor is electrically connected to the first electrode.

14. The electrophoretic display device of claim 1, further comprising a protection layer disposed in a space between the first substrate and the first electrode.

15. An electrophoretic display device, comprising:
a first substrate including a first electrode;
a first insulation layer provided on the first electrode;
a fluid layer provided on the first insulation layer and having fluid and charged particles;
a second substrate facing the first substrate with the fluid layer therebetween, and including a second electrode facing the first electrode; and
a second insulation layer provided between the second electrode and the fluid layer, and facing the first insulation layer;
wherein at least one of the first insulation layer and the second insulation layer includes a first functional group exposed on a surface of said at least one of the first insulation layer and the second insulation layer, and the charged particles include a second functional group exposed on the surface of said at least one of the first insulation layer and the second insulation layer and available for a hydrogen bond with the first functional group.

16. The electrophoretic display device of claim 15, wherein the first functional group and the second functional group are one of the same as each other and different from each other, and are independently one of an acryl group, $-OR^1$, $-F$, $-NR^2R^3$ and a combination thereof, and the $R^1$ to $R^3$ are one of the same as each other and different from each other, and are independently one of hydrogen, a C1 to C10 alkyl group, a C2 to C30 heteroaryl group, a C6 to C30 aryl group and a combination thereof.

17. The electrophoretic display device of claim 16, wherein the C1 to C10 alkyl group comprises one of a substituted C1 to C10 alkyl group and an unsubstituted C1 to C10 alkyl group.

18. The electrophoretic display device of claim 16, wherein the C2 to C30 heteroaryl group comprises one of a substituted C2 to C30 heteroaryl group and an unsubstituted C2 to C30 heteroaryl group.

19. The electrophoretic display device of claim 16, wherein the C6 to C30 aryl group comprises one of a substituted C6 to C30 aryl group and an unsubstituted C6 to C30 aryl group.

20. The electrophoretic display device of claim 15, wherein at least one of the first insulation layer and the second insulation layer includes at least one of silicon oxide ($SiO_2$) and silicon nitride ($SiN_x$).

21. The electrophoretic display device of claim 15, wherein at least one of the first insulation layer and the second insulation layer includes at least one of a photosensitive material and a polyimide including an acryl group.

22. The electrophoretic display device of claim 15, wherein at least one of the first insulation layer and the second insulation layer is surface-treated by at least one of oxygen plasma, nitrogen plasma, and fluorine plasma.

* * * * *